United States Patent
Sudano (10) Patent No.: US 6,334,379 B1
(45) Date of Patent: *Jan. 1, 2002

(54) MINI-BLIND CUT-DOWN MACHINE

(75) Inventor: Angelo Sudano, Montreal (CA)

(73) Assignee: Royal Window Coverings (Canada) Inc., Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,785

(22) Filed: Aug. 4, 1998

(30) Foreign Application Priority Data

Feb. 26, 1998 (CA) .............................. 2230839

(51) Int. Cl.⁷ .............................. B26D 7/06; B23P 19/04
(52) U.S. Cl. .............................. 83/452; 83/629; 29/24.5
(58) Field of Search .................. 33/452, 167, 464–465, 33/467.1, 468, 468.1, 468.2, 631; 29/24.5

(56) References Cited

U.S. PATENT DOCUMENTS

| 1,922,751 A | * | 8/1933 | Thiermann ................ 83/631 X |
| 2,087,728 A | * | 7/1937 | Boriski ..................... 83/631 X |
| 4,244,255 A | * | 1/1981 | Dykstra ........................ 83/631 |
| 4,993,131 A | | 2/1991 | Graves et al. ............... 29/24.5 |
| 5,056,388 A | | 10/1991 | Dekker et al. ................ 82/59 |
| 5,072,494 A | | 12/1991 | Graves et al. ............... 29/24.5 |
| 5,339,716 A | | 8/1994 | Sands et al. .................. 83/452 |
| 5,349,730 A | | 9/1994 | Anderson et al. ............ 29/24.5 |
| 5,456,149 A | | 10/1995 | Eisenheimer et al. ......... 83/564 |
| 5,634,387 A | * | 6/1997 | Squires ..................... 83/631 X |
| 5,799,557 A | * | 9/1998 | Wang ..................... 83/471.1 X |
| 5,806,394 A | * | 9/1998 | Marocco .............. 83/522.19 X |
| 5,816,126 A | * | 10/1998 | Pluber ........................ 29/24.5 |
| 5,927,172 A | * | 7/1999 | Wang .......................... 83/454 |
| 6,000,308 A | * | 12/1999 | LaFountain et al. ...... 83/631 X |

FOREIGN PATENT DOCUMENTS

| CA | 624335 | 7/1961 |
| CA | 1316811 | 5/1989 |
| CA | 2032807 | 4/1992 |
| CA | 2082343 | 5/1993 |
| CA | 2112947 | 8/1994 |
| CA | 2114097 | 8/1994 |
| CA | 2136519 | 5/1996 |
| CA | 2174800 | 3/1997 |

* cited by examiner

Primary Examiner—M. Rachuba
(74) Attorney, Agent, or Firm—George A. Seaby (57) ABSTRACT

A cutting apparatus for blinds of the type having a head rail, a bottom rail, and a plurality of slats includes a frame defined by a base and a pair of opposed end walls with a blind receiving and severing area near one of the end walls. A drive screw supported by the end walls extends through a carriage slidable on the base for linear movement between the end walls, whereby the carriage can be driven along the length of the base by rotation of the drive screw. A knife on the carriage severs an end of a blind as the carriage advances through the blind receiving and severing area. A mandrel is removably mounted on an end wall in the blind receiving and severing area for receiving and supporting a head rail of the blind for inhibiting movement and /or distortion of the blind during cutting. A clamping block releasably clamps a blind in the frame.

9 Claims, 7 Drawing Sheets

MINI-BLIND CUT-DOWN MACHINE

SUMMARY OF THE INVENTION

This invention relates to an apparatus for cutting a mini-blind, i.e. to an apparatus for reducing the width of a venetian blind by cutting material from an end of the blind.

Venetian mini-blinds are commonly used as a low cost solution for covering windows. In order to reduce manufacturing costs, producers of such blinds often manufacture large quantities of mini-blinds in a limited number of sizes. The standard blind sizes usually fit the standard windows in modern homes and buildings. However, frequently older homes and buildings do not have standard sized windows, and consequently the standard size of blinds will not fit such windows. The alternative for older homes and buildings is to use custom made blinds, which are substantially more expensive than standard blinds.

In an effort to reduce the cost of custom made blinds, some suppliers produce custom-sized blinds by severing the ends of standard blinds which are wider than the window over which the blind is to be installed. This has given rise to a need for an apparatus for severing of the ends of a mini-blind while providing clean high quality cut ends.

Numerous solutions have been proposed for the problem, including the devices disclosed in U.S. Pat. No. 5,339,716 to Sands et al, and Canadian Patent Application No. 2,174,800 by Marocco (published in April 1997). While both of the devices are capable of severing the end of a blind, both suffer from the disadvantage that the head rail and the slates and the base rail are severed in separate cutting operations, which tends to increase the size and complexity of the cutting device. In addition, the mechanical arrangements for effecting the cutting operations tend to be complex, which increases the cost of the device and can reduce reliability. Finally the cutting operation of both devices tends to be laborious, thereby reducing the productivity of the device, that is, the rate at which blinds can be processed using the device.

An object of the present invention is to provide an apparatus for cutting a mini-blind which overcomes the above noted deficiencies.

Another object of the invention is to provide a cutting apparatus capable of producing a high quality cut end on a mini-blind, while being mechanically simple, reliable, and safe to use.

Accordingly, the present invention provides an apparatus for cutting a mini-blind of the type having a head rail, a bottom rail, and a plurality of slats. The apparatus includes a frame defined by a base and a pair of opposed end walls, and a mini-blind receiving and severing area proximate one of the end walls. A drive screw is operatively supported by the end walls and extends therebetween. A carriage is slidably disposed on the base for substantially linear movement between the end walls, the carriage being in threaded engagement with the drive screw, whereby the carriage can be driven along the length of the base by rotation of the drive screw. A knife is removably attached to the carriage for severing an end of a mini-blind as the carriage is advanced through the blind receiving and severing area of the frame. A mandrel is removably connected to an end wall and extends into the blind receiving and severing area of the frame, the mandrel being capable of receiving and supporting the head rail of the mini-blind, and inhibiting movement and/or distortion of the mini-blind during cutting. A clamp releasably clamps the mini-blind in the receiving and severing area of the frame.

Other features of the apparatus of the present invention include:

a top plate fixedly mounted on the end walls. The top plate includes an elongated, longitudinally extending slot which serves as a linear guide for the carriage;

an impact resistant, transparent cover fixedly mounted on the end walls, adjacent to and abutting the top plate. The cover serves to protect a user from upwardly projected debris during severing of a blind while offering a substantially unobstructed view of the severing operation. Preferably, the apparatus further includes an impact resistant, transparent front plate extending between the end walls, and extending downwardly from the cover. The front plate serves to protect a user from forwardly projected debris during severing of a blind while offering a substantially unobstructed view of the severing operation. By means of the cover and the front plate, the user is able to continuously monitor a severing operation, while being protected from flying debris. Thus a high quality cut can be ensured, and the safety of the operator is enhanced;

a gauge assembly for selectively controlling the amount of material to be severed from each end of a blind. The gauge assembly includes a gauge holder, a ruler slidably mounted on the gauge holder, and a stop bar depending from an end of the ruler. The ruler includes indices indicative of the length of material to be removed from a blind. Preferably, the indices are marked as a half-scale, such that the length indicated on the ruler corresponds to the total amount by which a blind will be shortened when material has been removed from both ends of the blind;

the gauge holder is operatively mounted on the carriage above the top plate, and includes a lock for releasably locking the ruler in a selected position. The lock includes a pressure plate movably disposed within a bore in the gauge holder, and a pressure-screw in the gauge holder for selectively pressing the pressure plate against the ruler. Friction between the ruler and the pressure plate serves to prevent unintentional movement of the ruler;

the gauge holder includes an integrally formed pointer located proximate the indices of the ruler, whereby the position of the stop bar can be accurately set by a user;

the stop bar includes an elongated free end defining an abutment surface substantially parallel to the path of movement of the carriage and located in the blind receiving and severing area of the frame. The abutment surface serves to limit the amount of material to be removed from an end of a blind. Thus, in use, the position of the abutment surface of the stop bar can be set by adjusting the ruler, with reference to the ruler indices and the pointer of the gauge holder. The position of the abutment surface of the stop bar can then be locked using the lock. Subsequently, a blind can be inserted into the blind receiving and severing area of the frame until the head rail, slats, and base rail contact the abutment surface of the stop bar, thereby ensuring that the material will be removed from the ends of all of the components of the blind. Furthermore, a substantially equal length of material can be reliably removed from the ends of a plurality of blinds, without stopping to measure prior to each severing operation. This increases production and reliability;

the knife includes a cutting edge for severing a blind within the cutting area of the frame. Preferably, the cutting edge is concave, so that the cutting edge first contacts opposite longitudinal edges of a blind during severing of the blind. This has the effect of reducing the forces required for cutting, and reduces the tendency of the blind components to twist or deform during the severing operation;

the knife includes a first side extending rearwardly from the cutting edge and substantially parallel to a direction of movement of the knife during a cutting operation. The first side can be concave for providing a curved end on a severed blind, which is visually more pleasing;

the mandrel includes at least one surface having an arcuate contour corresponding to that of the first side of the knife. Thus the cutting edge of the knife and the mandrel cooperate to provide efficient shearing of a blind as the knife is advanced through the blind receiving and severing area of the apparatus;

the knife includes a second side extending rearwardly from the cutting edge at an angle with respect to the first side to define a wedge at the leading end of the knife. The knife further includes a shoulder at the rear end of the wedge. The shoulder operatively engages an edge of the carriage to stabilize the knife, and thereby prevent undesired movement of the knife during repeated severing operations;

the drive screw is rotated by a crank handle or by a power drive system such as an electric motor;

the clamp cooperates with the mandrel to secure the head rail, slats and bottom rail of a blind as a single body within the blind receiving and severing area of the frame. The clamp includes a pin engageable with a groove in the base to limit forward movement of the clamp; and at least in the vicinity of the blind receiving and severing area, the frame is provided with large radius fillets and bevelled edges to promote clearing of debris from the apparatus. This has the effect of making the apparatus effectively self-cleaning because debris from previous severing operations is cleared from the blind receiving and severing area by movement of the carriage. Consequently, numerous blind ends can be severed in succession without clogging or jamming the apparatus with debris.

The apparatus of the present invention is particularly suitable for severing the ends of mini-blinds constructed of PVC or similar thermoplastic material.

BRIEF DESCRIPTION OF THE DRAWINGS

Further features and advantages of the present invention will become apparent from the following detailed description, taken in combination with the appended drawings, in which:

FIG. 7c is a cross section taken generally along line C—C of FIG. 7a;

FIG. 8 is an exploded cross-sectional view of a gauge used in the apparatus of FIG. 1;

DETAILED DESCRIPTION OF PREFERRED EMBODIMENT

Figure 1:
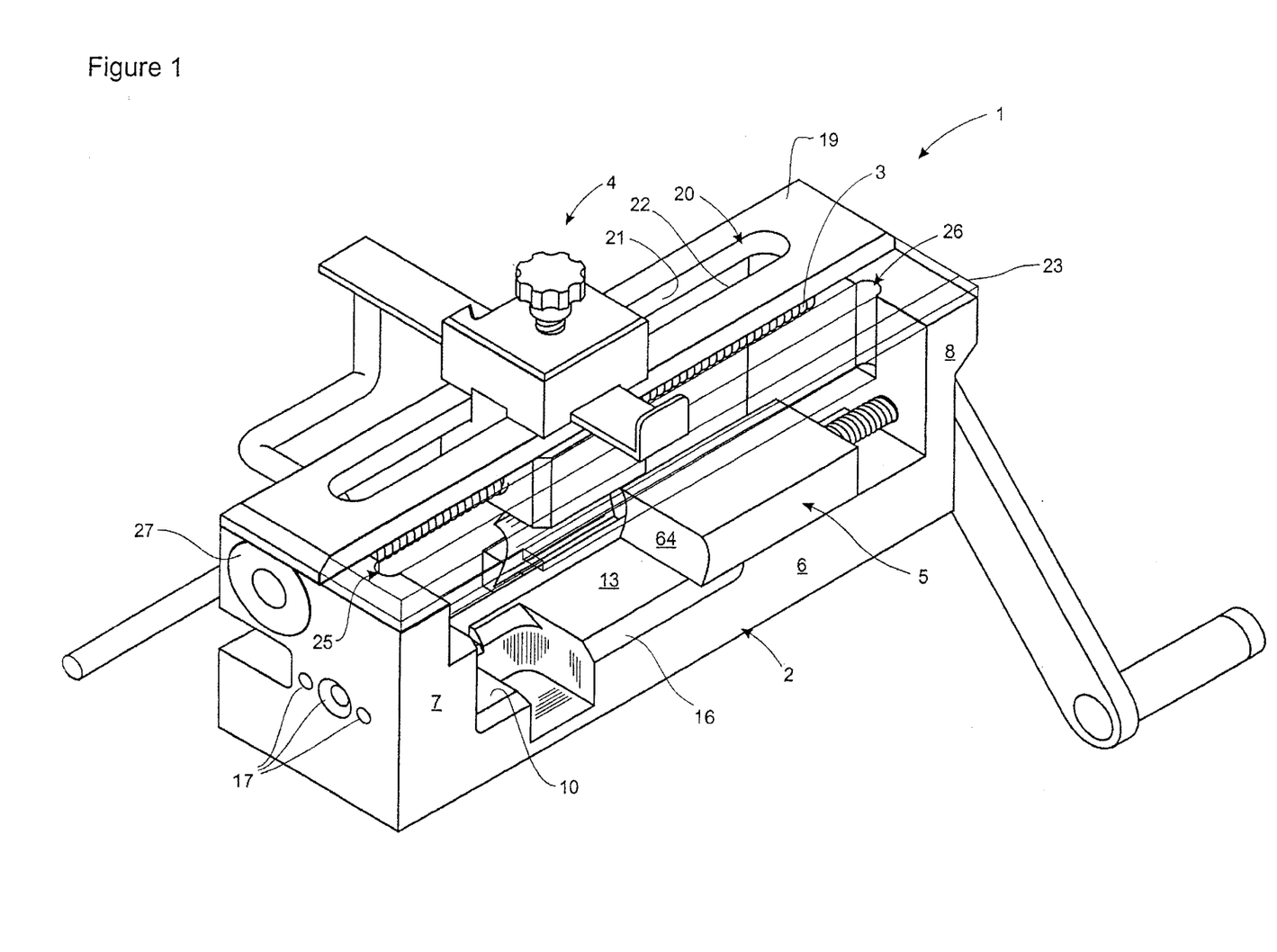
FIG. 1 is an isometric view of a mini-blind cutting apparatus in accordance with the present invention.
Figure 2:
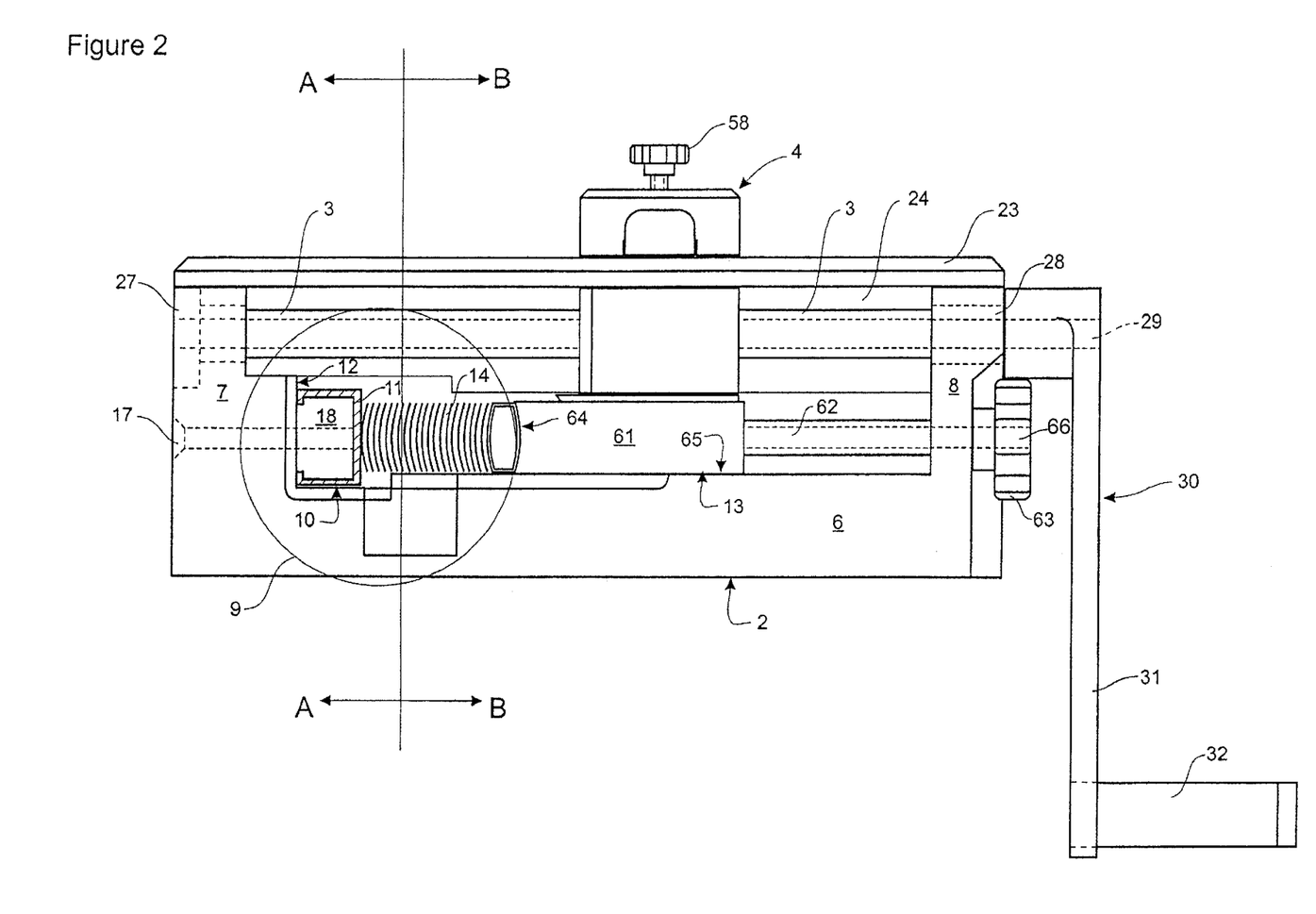
FIG. 2 is a side view of the apparatus of FIG. 1, with a blind shown clamped in a blind receiving and severing area of the apparatus.

Referring to FIGS. 1 and 2, the basic elements of the cutting apparatus which is generally indicated at 1 includes a frame 2, a drive screw 3, a cutter assembly 4, and a clamp 5.

The frame 2 is defined by an elongated supporting and guiding platform or base 6, and end walls 7 and 8 on opposite ends of the base 6. One end wall 7 and the base 6 define a blind receiving and severing area 9, which is circled in FIG. 2. The frame 2 can be formed of any suitable material having sufficient strength, rigidity and toughness such as steel or aluminum. The end walls 7 and 8 are integral with the base 6.

As best shown in FIGS. 1 and 2, the blind receiving and severing area 9 of the base 6 includes a recess 10 defining a head rail guide surface for supporting and guiding a blind head rail 11 into the area 9, and for supporting the head rail 11 during a cutting operation. The interior surface 12 of the end wall 7 extending vertically from the head rail guide surface 10 serves as a backstop to further support the head rail 11 during a cutting operation. A clamp guide surface 13 extends from the surface 10 to the other end wall 8. Conveniently, the guide surface 13 is at a higher level than the head rail guide surface 10 to support the blind slats 14 and bottom rail 14' which are typically narrower than the head rail 11 of a blind (see FIG. 2).

At least in the vicinity of the blind receiving and severing area 9, the frame includes large radius fillets 15 and bevelled edges 16 (see FIGS. 3 and 4) to facilitate clearing of debris from the apparatus 1. This has the effect of making the apparatus 1 effectively self-cleaning, because debris from severing operations is cleared from the blind receiving and severing area 9 by movement of the cutter assembly 4. As a result, numerous blind ends can be severed in succession without clogging or jamming the apparatus 1 with debris.

Figures 3, 4:
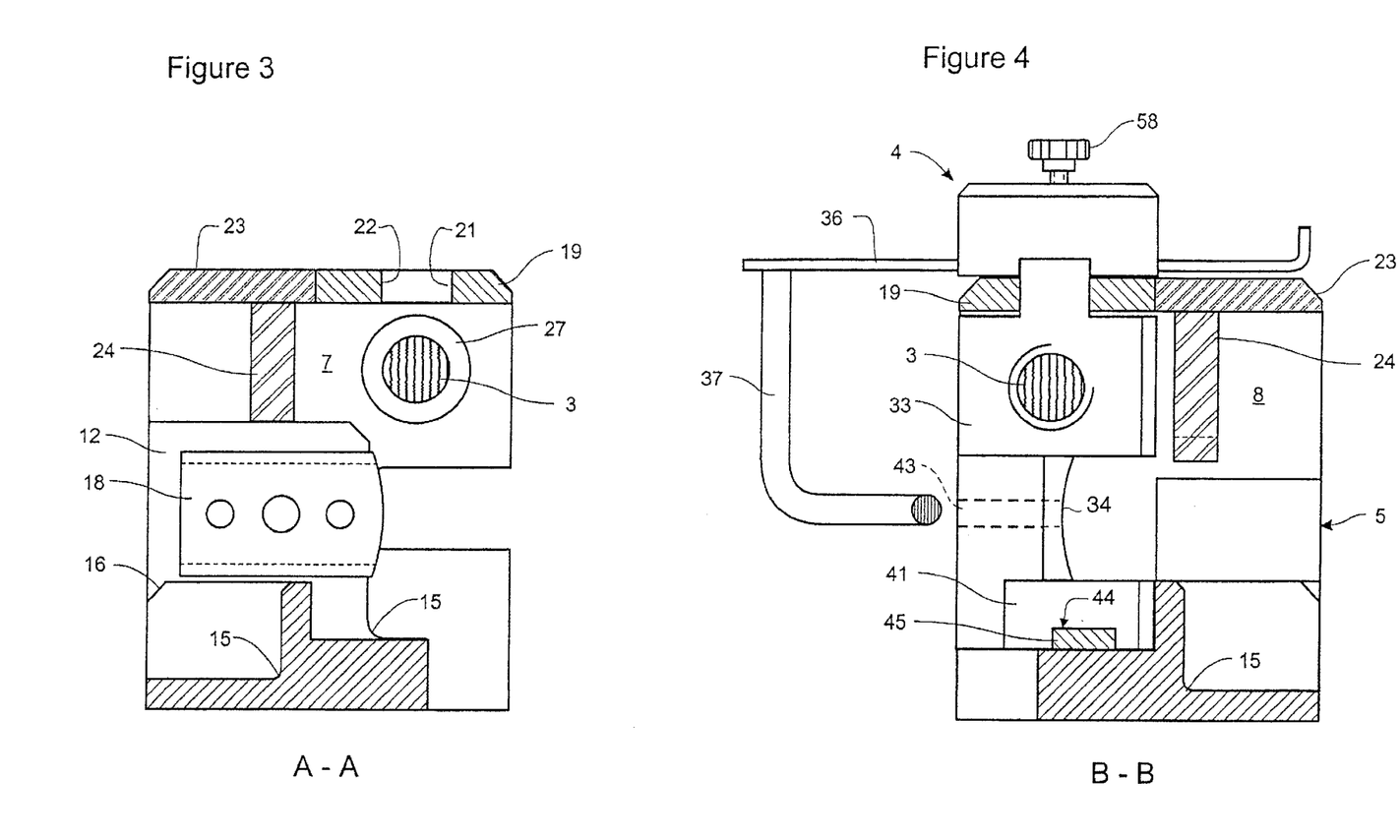
FIG. 3 is a cross section taken generally along line A—A of FIG. 2.
FIG. 4 is a cross section taken generally along line B—B of FIG. 2.

The end wall 7 includes holes 17 for receiving bolts, (not shown) for removably securing a mandrel 18 to the surface 12 in the blind receiving and severing area 9 of the apparatus 1. In FIGS. 2 and 3, the mandrel 18 is illustrated as being generally rectangular in cross section. However, in practice, several mandrels having different cross sections are provided, so that an appropriate mandrel can be selected depending on the cross section of the head rail 11 of a blind being cut. In use, a mandrel 18 is selected to fit snugly within the head rail 11 of a blind, and then secured to the surface 12. A blind can then be inserted into the blind receiving and severing area 9, with the head rail 11 being slid over the mandrel 18 (as shown in FIG. 2). With this arrangement, the head rail 11 is held securely in position, and movement and distortion of the head rail 11 during a cutting operation is minimized, so that a high quality cut end of the blind is obtained.

A top plate 19 extends between the end walls 7 and 8 of the frame. The plate 19 is securely fastened to the frame by bolts (not shown). The top plate 19 includes an elongated, longitudinally extending slot 20 having opposed sides 21 and 22 which serve as a linear guide for the cutter assembly 4.

As best seen in FIGS. 1, 3 and 4, an impact resistant, transparent cover 23 extends between the end walls 7 and 8 in front of and abutting the top plate 19. The cover 23 protects a user from debris flying upwardly during severing of a blind while offering a substantially unobstructed view of a cutting operation.

Similarly, an impact resistant, transparent front plate 24 (FIGS. 3 and 4) is mounted between the end walls 7 and 8, and extends downwardly from the cover plate 23. The front plate 24 is mounted in grooves 25 and 26 (FIG. 1) in the end walls 7 and 8 of the frame 2. With this arrangement, the front plate 24 is retained in position by the grooves 25 and 26, and the cover 23, thereby securely fastening the front plate 24 while avoiding the additional cost and complexity associated with the use of additional screws or bolts to secure the front plate 24. The front plate 24 serves to protect a user from debris flying forwardly during severing of a blind while offering a substantially unobstructed view of the severing operation. Thus, because of the cover 23 and the front plate 24, the user is able to continuously monitor a cutting operation, while being protected from flying debris. Consequently, a high quality cut can be ensured, and the safety of the operator is assured. The cover 23 and front plate 24 can be constructed of any suitable material providing transparency and impact resistance such as, for example Lexan (trademark) or Plexiglas (trademark).

The drive screw 3 extends between the end walls 7 and 8 of the frame 2, and is supported for rotation by bearings 27 and 28 mounted in the end walls 7 and 8, respectively. As shown in FIGS. 1 and 2, the bearing 27 is designed to absorb thrust loads. Cutting forces generated during a severing operation impose a tensile load on the drive screw 3 between the cutter assembly 4 and the bearing 27. This arrangement minimizes the length of the stress path between the cutter assembly 4 and the surface 12 and the mandrel 18, thereby minimizing the potential for distortion of the drive screw 3 and the frame 2 (and any consequent reduction in the quality of the cut end of a blind) during the cutting operation. The end 29 of the drive screw 3 extends through the bearing 28 for receiving a crank 30. The crank 30 includes a crank arm 31 connected to the free end 29 of the screw 3 by conventional means such as a bolt, a shear pin, a clevis pin or a key and groove (not shown). A handle 32 is mounted on the outer end of the crank arm 31. The handle 32 is mounted in the crank arm 31, i.e. it is slid through the crank arm 31 in the longitudinal direction of the handle 32 (as shown in phantom outline in FIG. 2). Alternatively, the screw 3 can be driven by an electric motor (not shown) coupled to the free end 29 of the screw 3 either directly or via a gear or belt drive system.

Figure 5:
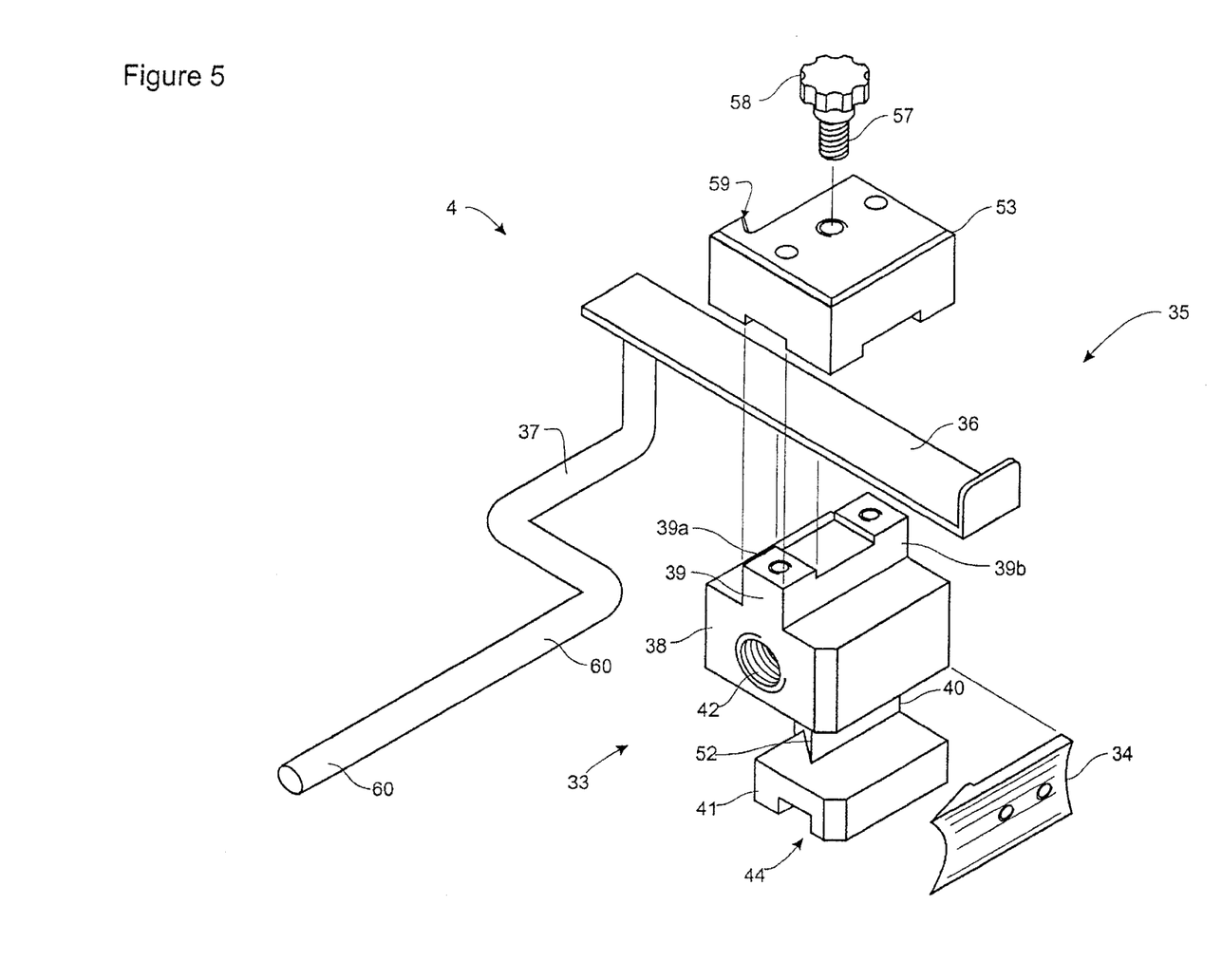
FIG. 5 is an exploded perspective view of a cutter assembly used in the apparatus of FIG. 1.

Referring to FIG. 5, the cutter assembly 4 includes a carriage generally indicated at 33, a knife 34 attached to the carriage 33, and a gauge assembly 35 including a ruler 36 and a stop bar 37 mounted in the top end of the carriage 33. The carriage 33 is mounted on the base 6 for linear movement between the end walls 7 and 8. The carriage 33 includes a drive block 38 including a guide head 39, a knife mount 40 extending downwardly from the drive block 38, and slider block 41 on the bottom end of the knife mount 40. The drive block 38 is a generally rectangular body with the guide head 39 extending upwardly therefrom. A threaded hole 42 in the block 38 receives the screw 3. Side surfaces 39a and 39b of the head 39 slidingly engage the interior surfaces 21 and 22 of the slot 20 in the top plate 19 to prevent rotation of the cutter assembly 4 around the longitudinal axis of the drive screw 3 as the latter rotates. The threads in the hole 42 engage the drive screw 3 so that the drive block 38 (and thus the cutter assembly 4 as a whole) can be driven along the length of the frame 2 by rotation of the drive screw 3. The knife mount 40 provides a secure support for the knife 34, which is positioned so that the cutting edge of the knife 34 is approximately centered under the drive screw 3 to minimize any twisting of the cutter assembly 4 during a cutting operation. The knife mount 40 includes at least one hole 43 (FIG. 4) allowing passage of a bolt (not shown) for securing the knife 34 to the knife mount 40. The slider block 41 on the bottom end of the knife mount 40 includes a groove 44 for slidably engaging a rail 45 on the base 6 so that the carriage 33 cannot move laterally during cutting operations. The carriage 33 is made of any suitable material such as steel or aluminum. The carriage 33 is made as a single "monolithic" body by casting and/or machining, thereby allowing the carriage 33 to be manufactured at low cost, while ensuring maximum strength and rigidity.

Figure 6:
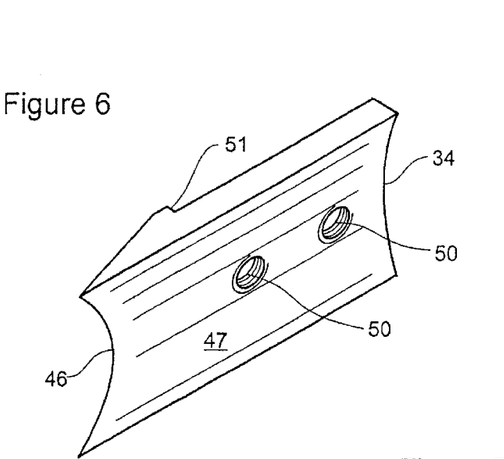
FIG. 6 is an isometric view of a knife used in the apparatus of FIG. 1.
Figure 7A:
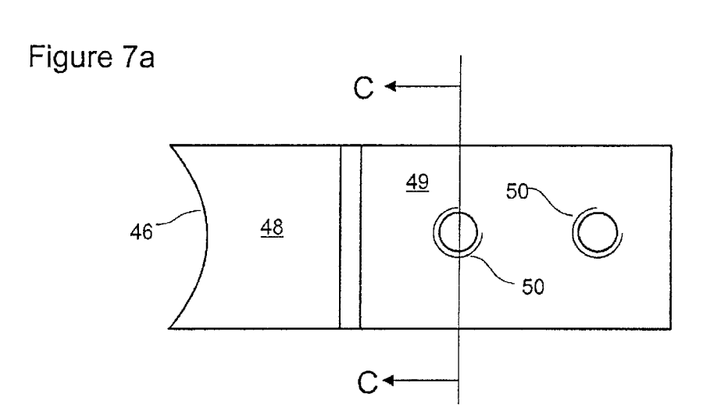
FIGS. 7a and 7b are rear and top views, respectively of the knife of FIG. 6.
Figure 7B:
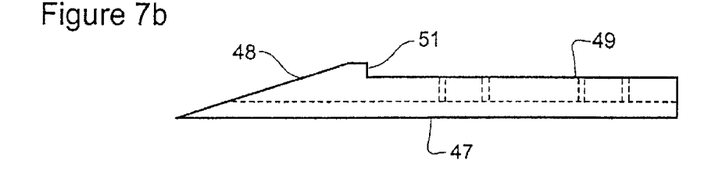
Figure 7C:
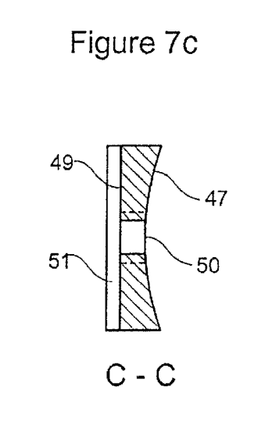

The knife 34 is removably attached to the knife mount 40 and is designed to sever an end of a mini-blind as the cutter assembly 4 is advanced through the blind receiving and severing area 9 of the apparatus 1. As shown in FIGS. 6–7c, the knife 34 includes a cutting edge 46, a front surface 47, a tapered cutting end 48 on a rear surface 49 and holes 50 which are aligned with the holes 43 of the knife mount 40. The cutting edge 46 severs a blind as the knife 34 is advanced through the area 9. The cutting edge 46 is concave so it first contacts the edges of a blind during a severing operation. This has the effect of reducing the force required for cutting, and reduces the tendency of the blind components to twist or deform during cutting. The front surface 47 of the knife 34 is concave. If desired, the front surface 47 can be planar. The concave shape of the front surface 47 is preferable, because it produces a curved end on a severed blind, which is visually more pleasing.

The tapered cutting end 48 of the rear surface 49 defines a wedge extending rearwardly from the cutting edge 46. The wedge is angled away from the mandrel 18 so that forces generated as the knife 34 advances through a blind will tend to urge the knife 34, and thus the cutter assembly 4 laterally toward the mandrel 18, thereby ensuring a clean shearing of the blind as the knife 34 advances toward the mandrel 18 during a cutting operation. The precise contour of the wedge and the angle defined between the wedge surface and the front surface 47 will largely be a matter of design preference, taking into consideration the fact that reducing the angle tends to reduce the forces generated during the severing operation but produces a cutting edge 46 which dulls more rapidly.

The remainder of the rear surface 49 of the knife 34 is parallel to the front surface 47. The rear surface 49 is planar to provide stable engagement with the knife mount 40 of the carriage 33. The knife 34 further includes a shoulder 51 at the trailing end of the wedge 48 in the direction of knife travel during cutting. The shoulder 51 engages a leading edge 52 of the knife mount 40 (in the direction of carriage movement during cutting) to stabilize the knife 34, and thereby prevent undesired movement of the knife 34 during repeated severing operations, while at the same time minimizing the forces acting on the bolts securing the knife 34 to the knife mount 40.

A gauge assembly 35 is securely mounted to the top of the drive block 38 for controlling the amount of material to be severed from each end of a blind. The gauge assembly 35 is mounted on the upper end of the guide head 39 using screws (not shown). The gauge assembly 35 includes a gauge holder 53, the ruler 36 slidably mounted in the holder 53, and the stop bar 37 depending from the rear end of the ruler 36.

Referring to FIG. 8, the gauge holder 53 includes a lock 54 for releasably locking the ruler 36 in a selected position. The lock 54 includes a pressure plate 55 movably mounted in a groove 56 in the bottom of the holder 53, and a screw 47 mounted in the holder 53 for pressing the plate 55 against the ruler 36 when rotated using a knob 58 on the top end of the screw 57. Friction between the ruler 36 and the plate 55 prevents unintentional movement of the ruler 36. Other locking means such as a spring-loaded pressure plate or a latch or pin arrangement which engages detents on the ruler could also be used.

In order to ensure accuracy and reproducibility of blind severing operations, the ruler 36 includes indices (not shown) permanently formed thereon (such as by engraving or etching), and the holder 53 includes an integrally formed pointer 59 (FIG. 5) for alignment with the indices of the ruler 36. The ruler indices and the pointer 59 on the gauge holder 53 provide an indication of the lateral distance between the stop bar 37 and the cutting edge 46 of the knife 34 (i.e. the length of material which will be removed during the severing operation). The stop bar 37 can thus be positioned accurately by adjusting the ruler 36 with respect to the pointer 59. In principle, any convenient scale can be used for the indices on the ruler 36. However, it is particularly advantageous to mark the indices as a "half-scale", such that the length indicated on the ruler 36 corresponds to the total amount by which a blind will be shortened when material has been removed from both ends of the blind. This arrangement has the benefit of eliminating the need for the user to calculate the length of material to be severed from each end of a blind, thereby increasing speed and reducing the possibility of error.

The stop bar 37 extends downwardly from a free end of the ruler 36 and includes an elongated, horizontal abutment surface 60 parallel to the path of travel of the knife 43. The abutment surface 60 limits the length of material to be removed from an end of a blind. In use, the position of the abutment surface 60 of the stop bar 37 is set by adjusting the ruler 36 with reference to the ruler indices and the pointer 59. The position of the abutment surface 60 of the stop bar 37 is then locked using the lock 54. A blind is inserted into the area 9 until the head rail, slats, and bottom rail contact the abutment surface 60 of the stop bar 37, thereby ensuring that equal lengths of material will be removed from the ends of all of the components of the blind. Furthermore, a substantially equal length of material can be reliably removed from both ends of a plurality of blinds without stopping to measure prior to each severing operation. This serves to maximize production and reliability, while minimizing the risk of errors.

The clamp 5 (FIGS. 1 and 2) is mounted on the base 6 for securing a blind in the blind receiving and severing area 9. The clamp 5 includes a block 61 and a screw 62 which is rotated using a knob 63. The block 61 includes a concave clamping end 64 for engaging a bottom rail of a blind, and a bottom surface 65 for sliding on the surface 13 of the base 6. As shown in FIGS. 1 and 2, the clamping end 64 of the block 61 is curved to match the curvature of the bottom rail of a blind, so that the blind can be securely clamped in the area 9 of the apparatus without distorting the bottom rail of the blind. The clamping end 64 can be provided with a resilient pad (not shown) to prevent marring of the finish on the bottom rail of the blind. The block 61 can also include a spring loaded pin (not shown) which bears against the surface 13 of the base 6 and engages a groove (not shown) in the surface 13 to limit forward movement of the clamping block.

The screw 62 is rotatably mounted in the end wall 8 of the body 2 by means of a suitable bearing (not shown) capable of transmitting thrust loads between the clamp screw 62 and the end wall 8 of the frame 2. The outer end 66 of the screw 62 extends through the end wall 8 so that a knob 63 can be secured thereto. The opposite end of the screw 62 threadably engages the block 61, so that the block 61 will be caused to move linearly along the surface 13 of the base 6 by rotation of the screw 62. In use, the block 61 cooperates with the mandrel 18 and the interior surface 12 of the end wall 7 to secure the head rail, slats and bottom rail of a blind as a single unit in the blind receiving and severing area 9.

Figure 9:
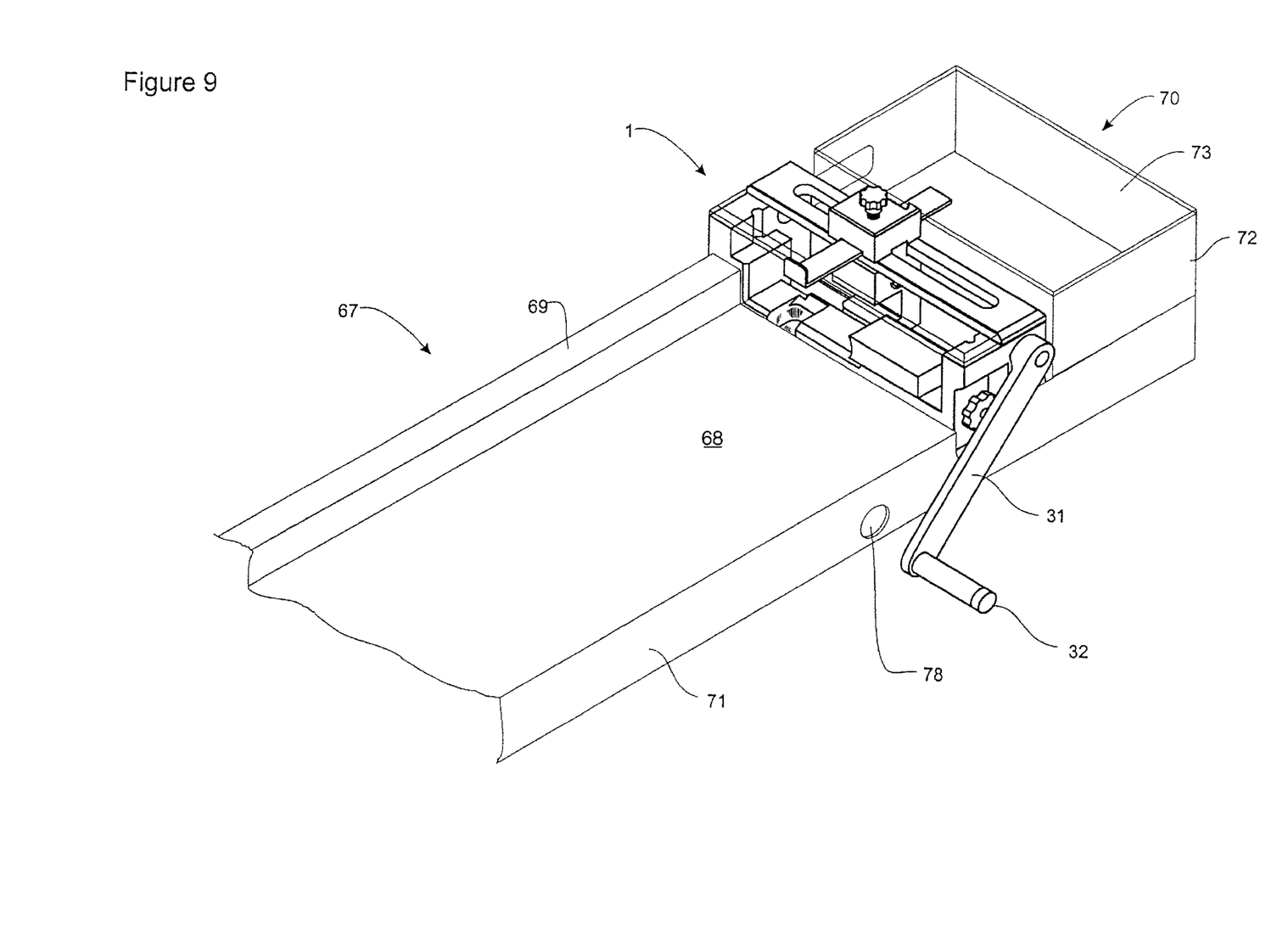
FIG. 9 is an isometric view of the apparatus of FIG. 1 mounted in a cutter table.

Referring to FIG. 9, in use, the apparatus 1 is mounted in an elongated cutting table 67, which includes a support surface 68, a fence 69, a debris collector 70 and a side wall 71. The apparatus 1 is mounted in the cutting table 67 so that the support surface 68 is at the same level as the head rail guide surface 10 of the apparatus 1. This ensures that a mini-blind head rail 11 is fully supported along its entire length during a cutting operation, and thus minimizes bending or twisting of the head rail 11. Similarly, the fence 69 is coplanar with the interior surface 12 of the end 7 of the frame 2 to ensure full support (and proper alignment) of the head rail 11 during the cutting operation.

Figure 10A:
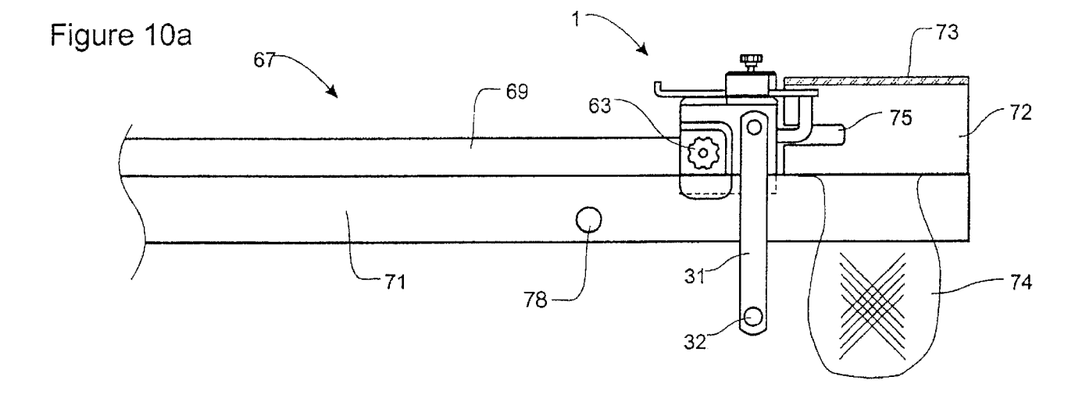
FIGS. 10a and 10b are partly sectioned side views of the table of FIG. 9 illustrating two embodiments of a debris collector for use with the apparatus of FIG. 1.
Figure 10B:
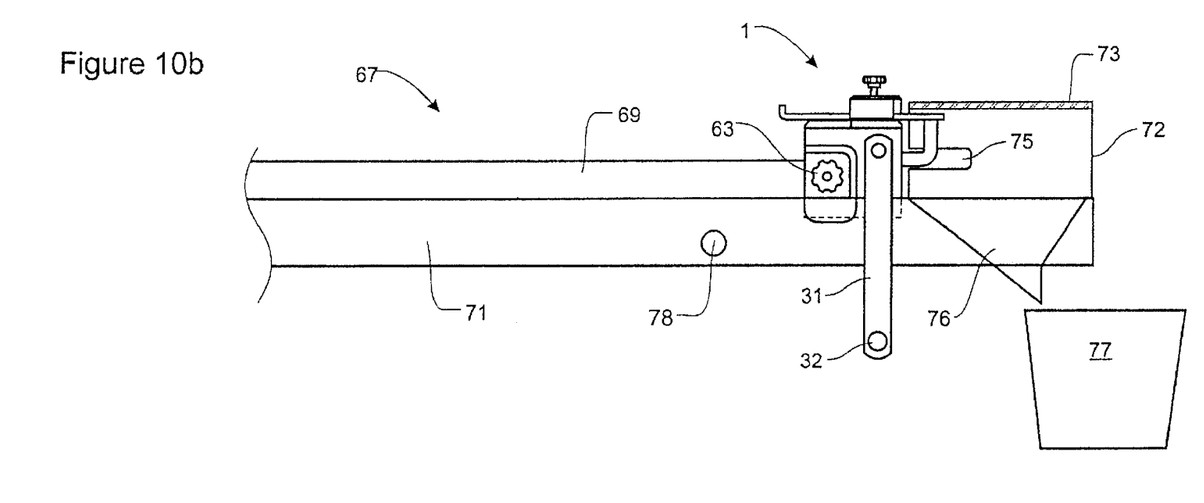

The debris collector 70 collects cut end portions and other debris generated during cutting operations. As illustrated in FIGS. 9 and 10a–b, the debris collector 70 includes an entrapment wall 72 extending around one end of the cutting table 67 and a transparent cover 73 removably mounted on the wall 72. As shown in FIG. 10a, a debris bag 74 can be secured to the cutting table 67 within the wall 72. The wall 72 and the cover 73 prevent flying debris escaping from the debris collector 70, and thereby contribute to workplace safety and cleanliness. The wall 72 can be made of any suitable material such as, for example steel or aluminum sheet plates. The cover 73 can be made of the same materials as the cover plate 23 and the front plate 24 and serves to stop flying debris while at the same time allowing unobstructed view of the apparatus. Preferably, the cover 73 is connected to the wall 72 by a hinge (not shown), which provides easy access to the apparatus 1. One side of the wall 72 includes a slot 75 to provide clearance for the stop bar 37.

The debris bag 74 collects debris generated during cutting operations, and can be of any suitable construction such as, for example, wire or polymer mesh or fabric. The surface of the cutting table 67 inside the wall 72 can be in the form of a chute 76 for collecting and directing cut debris into the debris bag 74 (FIG. 10b). Alternatively, a bucket or waste bin 77 constructed of any suitable material could be used in place of the debris bag 74.

As shown in FIGS. 9, 10a and 10b, the side wall 71 includes a hole 78 for receiving the handle 32 of the hand crank 30 when the apparatus is not in use. The handle 32 can be inserted into the hole 78 where it will not present a safety hazard to persons working around the apparatus. The hole 78 can be located in a position such that when the handle 32 of the hand crank 30 is inserted into the hole 78, the crank arm 31 is positioned over the knob 63 of the clamp screw 62. This arrangement ensures that when the apparatus 1 is not in use, the knob 63 is protected from accidental impact.

It will be apparent to those skilled in the art that the above-described embodiments of the present invention can be varied in many ways. For example, the present invention has been described as being designed for cutting venetian-type mini-blinds. However, it will be appreciated that the invention can readily be modified for use with larger, conventional venetian blinds. In addition, while the design of the present invention is particularly suited to cut PVC or other plastic blinds, aluminum blinds or other blinds can be severed using the apparatus of the present invention.

What is claimed is:

1. An apparatus for cutting a window blind having a head rail, a bottom rail and a plurality of slats therebetween, said apparatus comprising:

(a) a frame including a base and first and second end walls on said base;

(b) a mandrel on an interior surface of said first end wall for receiving the head rail of a blind and securing said head rail against said interior surface of said first end wall, said mandrel being removably mounted on said first end wall to facilitate mandrel replacement, whereby different mandrels can be mounted in said frame to accommodate different head rails;

(c) a clamp in said frame movable on said base between said second end wall and said mandrel for sliding towards said mandrel to push the bottom rail of a blind towards said mandrel to clamp the entire blind in said frame between said mandrel and said clamp;

(d) a carriage slidable on said base for movement between said first and second end walls towards and away from said mandrel;

(e) a drive screw extending between said first and second end walls and through said carriage for moving said carriage along said base between said first and second end walls;

(f) a knife on said carriage for severing a blind clamped in said body when said carriage is moved towards said first end wall and mandrel by rotation of the drive screw; and (g) a gauge on said carriage for determining the length of material cut from an end of said blind, said gauge including a ruler slidable on said carriage, and a stop carried by said ruler for limiting insertion of a blind into the frame.

2. The cutting apparatus of claim 1 including a top plate extending between rear portions of said first and second end walls; a slot extending longitudinally of said top plate; and a head on said carriage slidable in said slot for stabilizing the carriage in said frame.

3. The cutting apparatus of claim 2 including an impact resistant, transparent cover on front portions of said first and second end walls abutting said top plate for protecting an operator of the apparatus from upwardly flying debris while affording an unobstructed view of a severing operation.

4. The cutting apparatus of claim 2 including an impact resistant, transparent front plate extending between said first and second end walls beneath said cover for protecting an operator of the apparatus from forwardly flying debris while affording an unobstructed view of a severing operation.

5. The cutting apparatus of claim 1, wherein said gauge includes a holder on said carriage for slidably receiving said ruler; and a lock in said holder for releasably retaining the ruler and consequently said stop in a fixed position.

6. The cutting apparatus of claim 5, wherein said lock includes a pressure plate slidably mounted in said holder for releasably engaging said ruler; and a screw in said holder for moving said pressure plate against the ruler to lock the ruler between said holder and said carriage.

7. The cutting apparatus of claim 5, wherein said stop includes an elongated abutment surface parallel to the path of travel of said carriage in said frame for limiting insertion of a blind into the frame.

8. The cutting apparatus of claim 1, wherein said knife includes a shoulder for engaging said carriage for stabilizing the knife on the carriage during cutting operations.

9. The cutting apparatus of claim 1, wherein said clamp includes a block slidable on said base; and a clamp screw extending through said second end wall into engagement with said block for moving said block towards and away from said mandrel.

\* \* \* \* \*